United States Patent [19]

Hajec

[11] Patent Number: 4,734,606

[45] Date of Patent: Mar. 29, 1988

[54] ELECTRIC MOTOR WITH FERROFLUID BEARING

[76] Inventor: Chester S. Hajec, 2195 W. Highway 36, St. Paul, Minn. 55113

[21] Appl. No.: 830,350

[22] Filed: Nov. 20, 1985

[51] Int. Cl.$^4$ ............................................. F16C 39/06
[52] U.S. Cl. ..................................... 310/90.5; 310/62; 310/67 R; 310/90; 310/91; 310/156; 310/180; 277/80; 277/135; 384/133; 384/372
[58] Field of Search ...................... 310/62, 63, 90, 88, 310/90.5, 68 R, 157, 254, 261, 67 R, 51, 91, 208, 156, 180, 152, 184, DIG. 6, 181; 277/70, 80, 135; 335/51; 384/133, 372, 144, 446, 480

[56] References Cited

U.S. PATENT DOCUMENTS

| | | | |
|---|---|---|---|
| 3,196,301 | 7/1965 | Turk | 310/90 |
| 3,356,425 | 12/1967 | Carriere et al. | 308/10 |
| 3,742,267 | 6/1973 | Papst | 310/67 R |
| 3,834,775 | 9/1974 | Tuffias | 277/80 |
| 3,977,739 | 8/1976 | Moskowitz et al. | 308/187 |
| 4,074,158 | 2/1978 | Cole | 310/90 |
| 4,123,675 | 10/1978 | Moskowitz et al. | 310/49 R |
| 4,171,818 | 10/1979 | Moskowitz et al. | 277/80 |
| 4,174,484 | 11/1979 | Schmider | 310/68 R |
| 4,200,296 | 4/1980 | Stahl et al. | 277/80 |
| 4,252,328 | 2/1981 | Raj et al. | 277/1 |
| 4,252,353 | 2/1981 | Raj et al. | 277/80 |
| 4,254,961 | 3/1981 | Fersht | 310/90.5 |
| 4,284,605 | 8/1981 | Pierrat | 422/249 |
| 4,309,040 | 1/1982 | Pierrat | 277/80 |
| 4,340,233 | 7/1982 | Yamamura et al. | 277/1 |
| 4,357,021 | 11/1982 | Raj et al. | 277/1 |
| 4,357,022 | 11/1982 | Raj | 277/1 |
| 4,357,023 | 11/1982 | Yamamura | 277/1 |
| 4,357,024 | 11/1982 | Raj | 277/1 |
| 4,379,598 | 4/1983 | Goldowsky | 310/90.5 |
| 4,382,199 | 5/1983 | Isaacson | 310/87 |
| 4,407,508 | 10/1983 | Raj et al. | 277/1 |
| 4,407,518 | 10/1983 | Moskowitz et al. | 277/1 |
| 4,418,296 | 11/1983 | Ebentheuer | 310/67 R |
| 4,444,398 | 4/1984 | Black, Jr. et al. | 277/1 |
| 4,445,696 | 5/1984 | Raj et al. | 277/80 |
| 4,478,424 | 10/1984 | Raj | 277/80 |
| 4,489,950 | 12/1984 | Chorney | 277/80 |
| 4,527,802 | 7/1985 | Wilcock | 310/90.5 |
| 4,527,805 | 7/1985 | Gowda et al. | 277/80 |
| 4,531,846 | 7/1985 | Raj | 384/478 |
| 4,552,417 | 11/1985 | Yamashita | 310/90 |
| 4,644,205 | 2/1987 | Sudo | 310/90.5 |

OTHER PUBLICATIONS

"A New Fluid-Film Bearing Spindle for Disk Drives", Ferrofluidics Corp., Nashua, N.H.; Jun. 21, 1984.

*Primary Examiner*—R. Skudy
*Attorney, Agent, or Firm*—Kinney & Lange

[57] ABSTRACT

An electric motor including an integral ferrofluid bearing provides significant reduction in non-repeatable runout, stray flux, and audible noise over conventional motors using ball bearings. The motor includes a hub and a base, with the base attached to a tapered magnetically permeable shaft which defines an inner bearing race, and the hub attached to an internally tapered, magnetically permeable sleeve which defines an outer bearing race. Permanent magnets surround and are rotatable with the sleeve to provide mangetic fields which interact with the stator winding to cause rotation of the hub and sleeve. In addition, the permanent magnets form magnetic flux paths with the shaft and the sleeve to maintain ferrofluid lubricant between the inner and outer bearing races.

46 Claims, 10 Drawing Figures

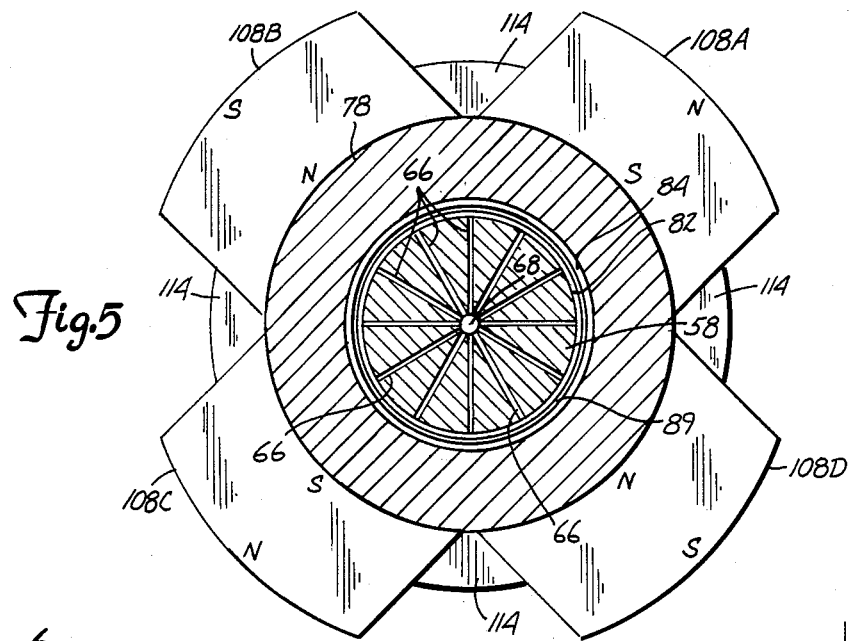
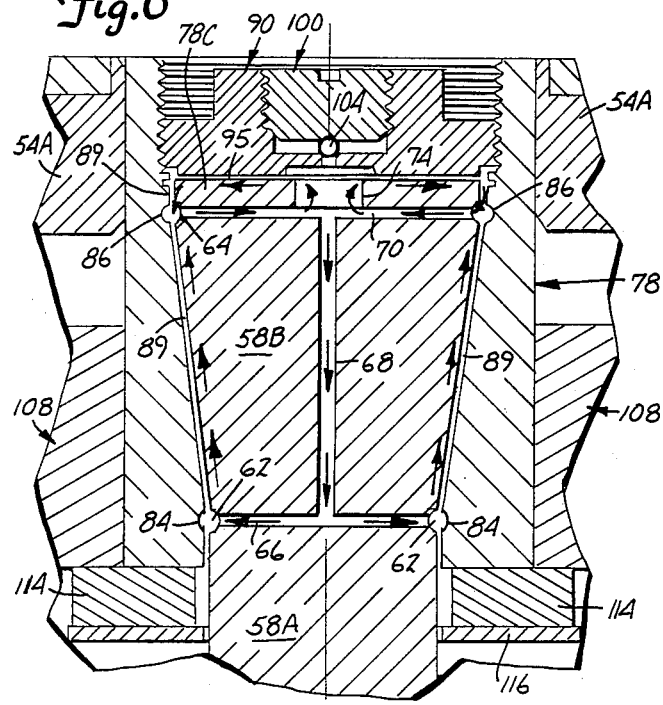
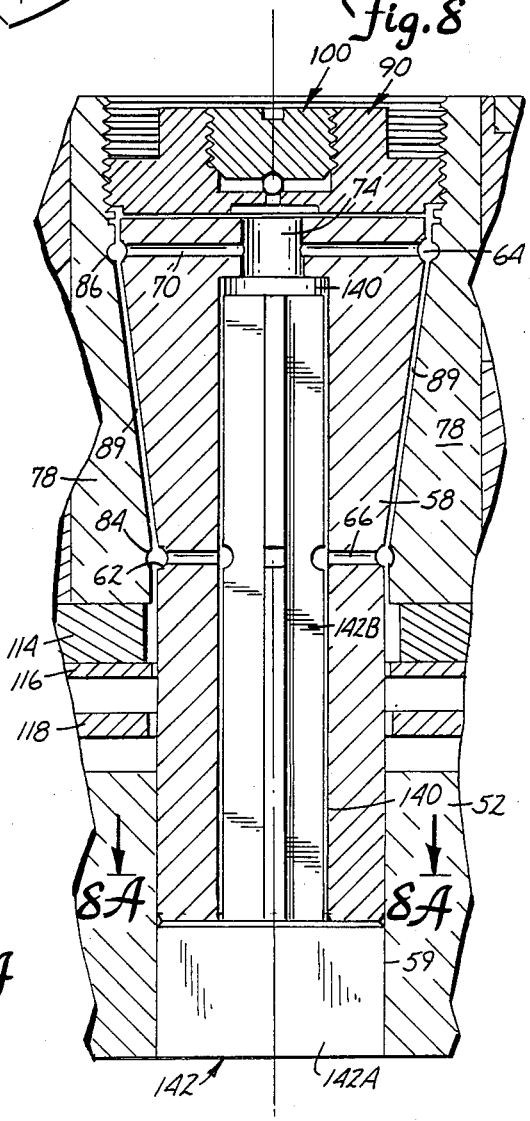
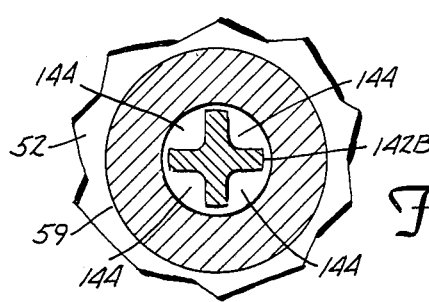

ELECTRIC MOTOR WITH FERROFLUID BEARING

BACKGROUND OF THE INVENTION

1. Field of the Invention.

The present invention relates to electric motors, and in particular to an electric motor having an integral ferrofluid bearing.

2. Description of the Prior Art.

Computer memory disk drive spindles typically use a DC brushless electric motor to drive the hub on which one or more memory disks are mounted. The ever increasing deamands for greater memory storage has placed ever increasing demands on the performance of the spindle motor.

There are several characteristics of the prior art electric motors which limit the performance of computer memory disk drives. These include non-repeatable run-out, stray flux, and audible noise.

The demand for higher capacity computer memory disks and disk drives dictates that the track spacing must become smaller, and as a result the non-repeatable run-out of the motor becomes a limiting factor on track density. The typical cause of non-repeatable runout is the use of ball bearings for supporting the rotation of the motor rotor and the hub. The ball bearing balls are continuously rotated, so that each time that the hub rotates through 360°, there is an unpredictable runout caused by the non-uniformity of the balls, the inner race, and outer race. With high performance ball bearings, non-repeatable runout is typically on the order of 10 to 20 microinches.

Stray flux (e.g. magnetic flux from the magnets or coils of the motor) which reaches the hub disk area is another limiting factor for magnetic disk memories. Stray flux causes problems relating to the signal-to-noise ratio. As information is recorded more densely on the disk, the write signal must be reduced to avoid interaction between the magnetic field from the write head and other adjacent bit areas on the disk. As the level of the write signal decreases, the level of noise (such as that produced by stray flux) must also be reduced in order to maintain an acceptable signal-to-noise ratio. Although partial shielding of the magnets, stator winding, and other electrical components of the motor is possible, stray flux from the motor remains one of the limiting factors in performance of a magnetic disk drive memory.

Audible noise associated with operation of the motor can be created by a variety of sources. The primary sources of audible noise are the bearings and wind currents caused by moving parts of the motor.

In June of 1984, Ferrofluidics Corporation of Nashua, N.H., announced development of a ferrofluid bearing spindle for use as a computer memory disk drive. The device uses ferrofluid bearings as an alternative to ball bearings in order to reduce non-repeatable runout.

Ferrofluid devices (and particularly ferrofluid seals) have been known for many years and have been used in a wide variety of applications. Ferrofluid seals typically involve the use of permanent magnets extending around a shaft to create a magnetic flux path which causes the ferrofluid to be retained within a predetermined gap. This defines one or more ferrofluid O-ring seals around the shaft.

SUMMARY OF THE INVENTION

The electric motor of the present invention includes a base, a hub, a shaft attached to the base to define an inner bearing race, a sleeve attached to the hub and coaxially positioned with the shaft to define an outer bearing race, a ferrofluid lubricant, permanent magnet means rotatable with the sleeve, and stator winding means supported by the base. The permanent magnet means interact with the fields from the stator winding means to cause rotation of the hub and sleeve. In addition, the permanent magnet means together with the shaft and the sleeve form a magnetic flux path which maintains the ferrofluid within the gap between the inner and outer bearing races.

In preferred embodiments, the inner race and the outer race have tapered surfaces which are generally parallel to one another. As a result, relative axial movement of the sleeve with respect to the shaft provides adjustment of the gap between the inner and outer races. The invention perferably includes means for varying the relative axial position of the shaft and the sleeve to vary the performance of the bearing formed by the inner and outer races and the ferrofluid lubricant.

BRIEF DESCRIPTION OF THE DRAWINGS

FIG. 5 is a sectional view along section 5—5 of FIG. 3.

FIG. 6 is a sectional view of the motor of FIG. 3 showing flow of the ferrofluid lubricant.

FIG. 8 is a sectional view showing another embodiment in which the shaft has an internal heat sink rod.

FIG. 8A is a sectional view along section 8A—8A of FIG. 8.

DETAILED DESCRIPTION OF THE PREFERRED EMBODIMENTS

Figure 1:
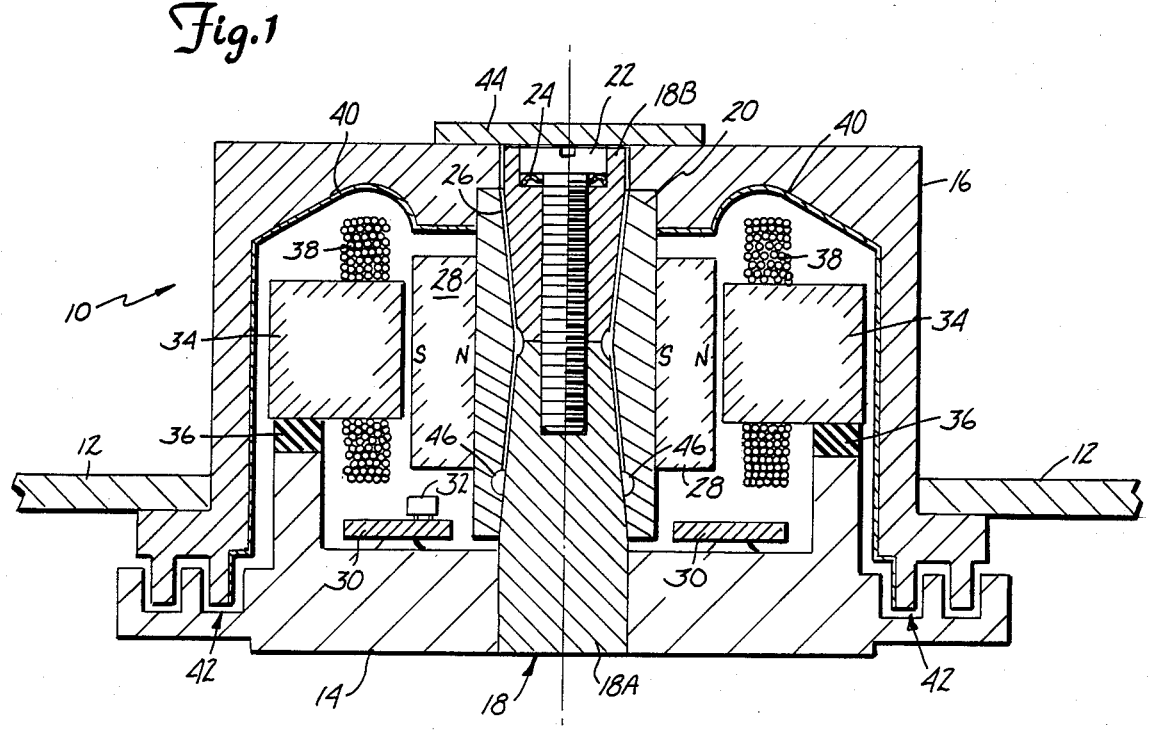
FIG. 1 is a cross sectional view of a first embodiment of the electric motor of the present invention.

As shown in FIG. 1, motor 10, includes a stationary base 14 and a rotating outer hub 16. Both base 14 and hub 16 are preferably aluminum. Computer memory disk 12 is mounted on hub 16 and rotate as hub 16 rotates with respect to base 14.

Motor 10 includes a ferrofluid bearing formed by two-part inner shaft 18, the outer surface of which forms an inner bearing race, and outer sleeve 20, the inner surface of which forms an outer bearing race. Lower shaft section 18A of shaft 18 is press-fitted into base 14, and preferably is permanently mounted to base 14 with an adhesive. Lower shaft section 18A tapers so that it is narrower at its top end. Upper shaft section 18B tapers in an opposite direction and is narrower at its lower end. Shaft sections 18A and 18B are held together by screw 22 and spring washer 24.

Sleeve 20 has an internal double taper which matches the tapers of shaft sections 18A and 18B. At its upper end, sleeve 20 is press-fitted into hub 16, and an adhesive is used to hold it permanently in place.

Positioned in gap 26 between shaft 18 and sleeve 20 is a ferrofluid lubricant. The ferrofluid lubricant is held in gap 26 between the shaft 18 and sleeve 20 by magnetic flux produced by a ring of permanent magnets 28 attached to sleeve 20. Magnets 28 also are the permanent magnets used to cause the rotation of hub 16. Magnetic flux flows from magnets 28 through sleeve 20, across gap 26 to shaft 18, and then back across gap 26 through sleeve 20 and back to magnets 28. Both shaft 18 and sleeve 20 are a magnetically permeable material such as magnetic stainless steel, so they provide a good flux path.

Mounted on base 14 is printed circuit board 30, which supports the drive circuitry for motor 10, as well as Hall effect magnetic sensors 32. Stator cores 34 are supported on vibration isolators 36, which in turn is supported on base 14. Stator windings 38 are wound on the poles of stator cores 34.

The inner surface of hub 16 has a coating 40 of a mangetic shield material. Coating 40 extends across the entire inner surface of hub 16 and down into the first leg of a labyrinth passage 42 formed by mating ridges and grooves in base 14 and hub 16. This labyrinth passage 42 makes it difficult for any contaminant to pass out of the interior of motor 10 and into the hub disk area.

Cap 44 is attached to hub 16 to cover the top end of the bearing area, so that the ferrofluid lubricant cannot escape, even if it got outside of the area defined by the magnetic flux path from magnets 28.

As an additional trap to prevent the escape of the ferrofluid lubricant, an annular groove 46 is formed near the lower end of sleeve 20. Groove 46, which is connected to the lower end of gap 26, provides a much wider gap between sleeve 20 and shaft 18, and thus a much lower flux path. As a result, groove 46 acts as a barrier to downward axial movement of the ferrofluid lubricant.

Figure 2:
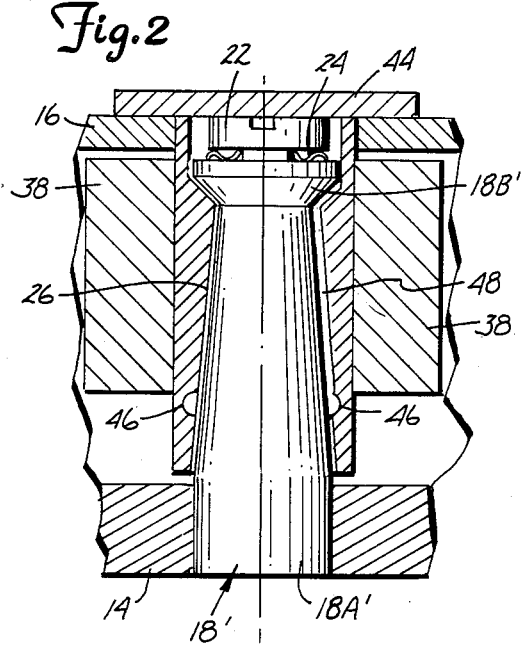
FIG. 2 is a sectional view of an electric motor similar to the motor in FIG. 1 but with a modified ferrofluid bearing.

Another feature of the present invention is best illustrated in FIG. 2, which shows a slightly different design of sleeve 20' and shaft 18'. In FIG. 2, upper shaft section 18B' is much shorter and has a much sharper taper. Otherwise the operating principle of the bearing is the same. In FIG. 2 there is a slot 48 provided in sleeve 20 which extends axially. This slot 48 is connected to gap 26 and acts as the reservoir for the ferrofluid lubricant. As sleeve 20 rotates with hub 16, there is a wiping action which occurs as slot 48 moves around the circumference of shaft 18.

Motor 50 shown in FIGS. 3-6 includes a stationary base 52 and a rotating outer hub 54. Hub 54, which has a first closed end and a second open end rotates about axis 56, which is defined by shaft 58. Hub 54 is generally cylindrical, with a top end 54A and a downwardly extending side wall 54B, and together with base 52 it encloses the entire drive and bearing mechanism of motor 50.

Figure 3:
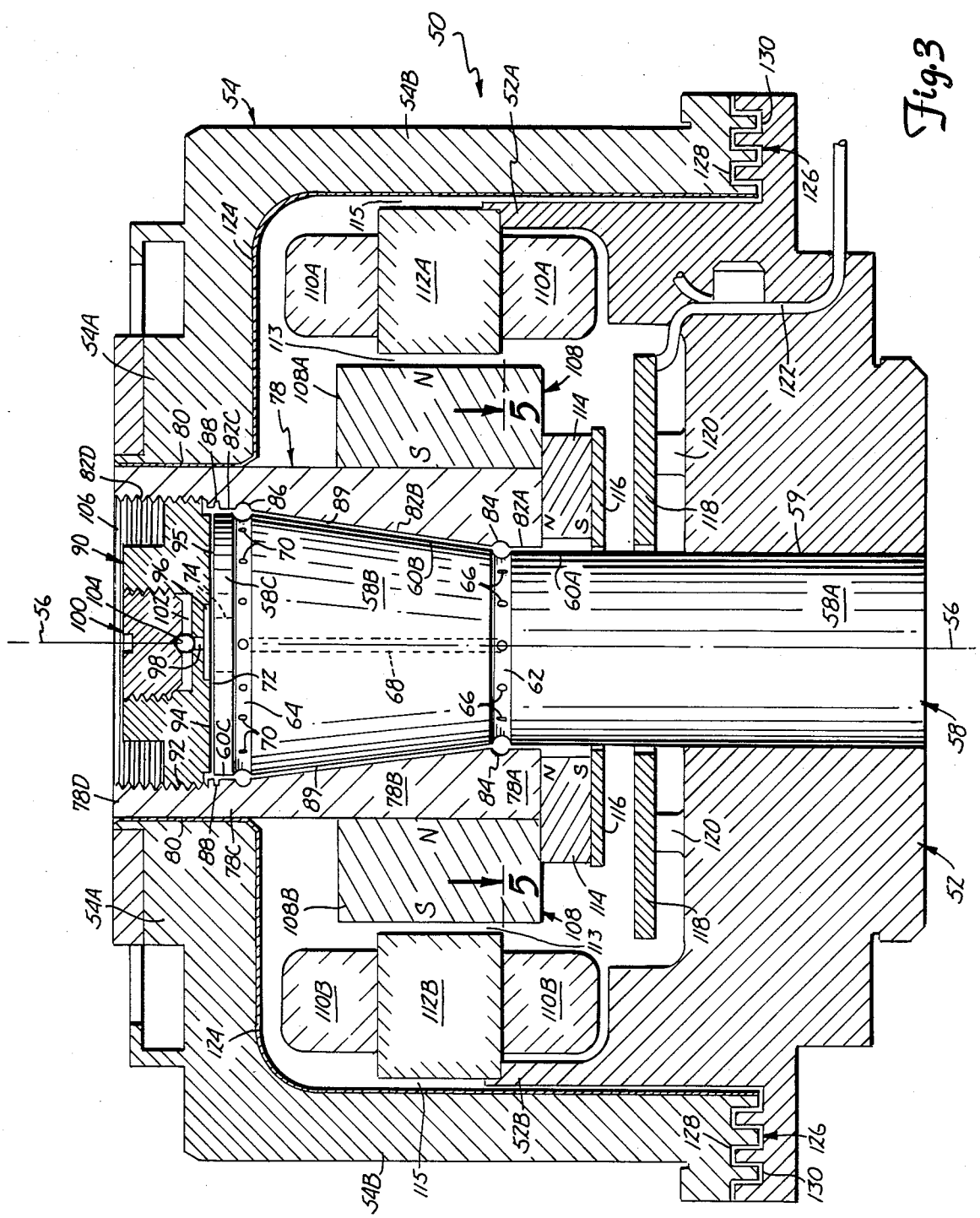
FIG. 3 is a sectional view of another embodiment of the electric motor of the present invention.

As shown in FIG. 3, shaft 58 has a lower section 58A which is press-fitted into cylindrical opening 59 of base 52 and is preferably secured by adhesive (not shown). Shaft 58 also includes a tapered intermediate section 58B, and a cylindrical top section 58C.

Located between a top end of surface 60A of shaft section 58A and a bottom end of surface 60B of tapered section 58B is annular groove 62. Similarly, annular groove 64 is located between an upper end of surface 60B and a lower end of surface 60C of shaft section 58C. A set of spaced, generally radial ports 66 extend from groove 62 toward the center of shaft 58, where they interconnect with axial passage 68 at its lower end. Similarly, ports 70 extend generally radially from groove 64 inwardly to connect with passage 68 at its upper end.

Figure 4:
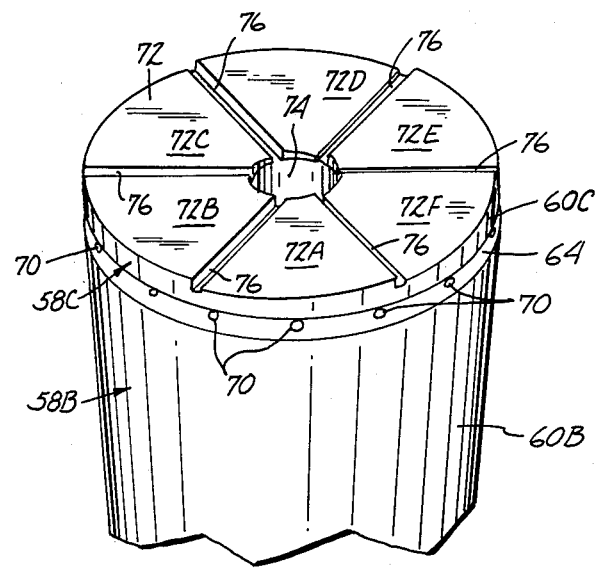
FIG. 4 is a perspective view of the shaft of the motor of FIG. 3.

Top section 58C of shaft 58 (which is best shown in FIG. 4) has a top surface 72 with a central core 74 which communicates with passage 68. Top surface 72 is divided into six inclined surface segments 72A–72F which are separated by radially extending grooves 76.

Mounted coaxially around shaft 58 is sleeve 78. At its upper end, sleeve 78 is press-fitted into cylindrical opening 80 of hub 54 and preferably is secured by an adhesive (not shown).

Sleeve 78 has a generally cylindrical lower section 78A, an internally tapered intermediate section 78B, a generally cylindrical upper section 78C, and an internally threaded top section 78D. Inner surface 82A of lower section 78A is generally parallel to the outer surface 60A of lower shaft section 58A. Annular groove 84 is positioned opposite to groove 62, and separates inner surfaces 82A and 82B of sleeve sections 78A and 78B, respectively. Sleeve section 78B is internally tapered so that its smallest inner diameter is at the lower end adjacent groove 84 and its largest inner diameter at its upper end adjacent annular groove 86. The taper of section 78B matches the taper of shaft section 58B so that surfaces 60B and 82B are parallel to one another.

Annular groove 86 is positioned so that it is generally aligned opposite groove 64 of shaft 58 when motor 50 is in operation. Groove 86 separates inner surfaces 82B and 82C of sleeve 78.

Inner surface 82C of sleeve 78 is generally parallel to the outer surface 60C of shaft 58. At its upper end, surface 82C is separated from internal threads 82D of threaded section 78D by annular groove 88.

Outer surfaces 60A–60C of shaft 58 and inner surfaces 82A–82C of sleeve 78 define a gap 89 which is filled with ferrofluid lubricant. Due to the parallel tapered surfaces 60B and 82B, the size of gap 89 depends on the relative axial positions of sleeve 78 and shaft 58.

Mounted within sleeve 78 is thrust bearing cap 90, which provides adjustment of the size of gap 89. External threads 92 of thrust bearing cap 90 mate with the internal threads 82D of sleeve 78, which permits cap 90 to be threaded into sleeve 78 until its bottom surface 94 is adjacent top surface 72 of shaft 58. Top surface 72 and bottom surface 94 define a gap 95 which is connected at its outer edges to the upper end of gap 89. Thrust bearing cap 90 includes a fluid reservoir 96 which is positioned opposite cavity 74 of upper shaft section 58C. Passage 98 communicates with reservoir 96 to permit ferrofluid lubricant to be introduced into reservoir 96 and into the ferrofluid bearing formed by shaft 58 and sleeve 78. Screw 100 is threaded into opening 102 in the top end of thrust bearing cap 90. Ball 104, which is engaged by the bottom end of screw 100, seals passage 98 to prevent the escape of ferrofluid lubricant through passage 98. Top cover 106 covers the top end of sleeve 78 to prevent any escape of the ferrofluid lubricant from the interior of the ferrofluid bearing formed by shaft 58 and sleeve 78.

Mounted on the outer surface of sleeve 78 are four permanent magnets 10, each of which extend approximately 90° around axis 56. Magnets 108 alternate in polarity around axis 56. For example, magnet 108A has its outer surface poled as a north pole (N-pole) and its inner surface as a south pole (S-pole). Magnet 108B, on the other hand, has its inner surface as an N-pole and its outer surface as an S-pole.

Permanent magnets 108 interact with magnetic fields produced by stator windings 110A and 110B which are wound on stator cores 112A and 112B, respectively causing rotation of the hub. In addition, permanent magnets 108 are part of a magnetic flux path through sleeve 78, gap 89 and shaft 58 so that ferrofluid lubricant is maintained and circulated within gap 89 between shaft 58 and sleeve 78.

Mounted at the bottom of sleeve 78 is a toroidal permanent magnet 114, and mounted below magnet 114 is a circular pole washer 116. Magnet 114, sleeve 78, shaft 58, and washer 116 provide a closed flux path which surrounds shaft 58 and provides a final barrier to escape of ferrofluid lubricant from the bottom end of the ferrofluid bearing.

Printed circuit board 118 is supported on posts 120, which are preferably an integral part of base 52. Printed circuit board 118 carries electrical components, including Hall effect sensors (not shown) which are used to selectively energize stator windings 110A and 110B to cause rotation of hub 54 and sleeve 78 with respect to base 52 and shaft 58. Electrical conductors 122 extend through an opening in base 52 to provide electrical power and control signals to printed circuit board 118. For clarity, the electrical connections between printed circuit board 118 and stator windings 110A and 110B are not shown in FIG. 3.

In the embodiments shown in FIGS. 3-6, stator cores 112A and 112B are suspended from upstanding arms 52A and 52B of base 52. As in the previous embodiment shown in FIG. 1, the embodiment in FIG. 3 provides air gaps 113, 115 on both sides of stator cores 112A and 112B to reduce stray flux.

A magnetic shield coating 124 is provided on the inner surface of hub 54 and extends down into the first leg of labyrinth passage 126 formed by base 52 and hub 54. The labyrinth passage is formed by a series of annular ribs and grooves 128 in the lower end surface of side wall 54B of the hub 54, and by complimentary ribs and grooves 130 in a mating surface of base 52.

During operation of motor 50, the ferrofluid lubricant is circulated throughout the ferrofluid bearing. This reduces the possibility of "hot spots" and assures a uniform fluid temperature. It also aids in the cooling of the bearing surfaces.

FIG. 6 shows the circulation patterns of the ferrofluid lubricant. The ferrofluid lubricant migrates along gap 89 upward from annular grooves 62 and 84 toward grooves 64 and 86. This upward migration is caused by the nonuniform magnetic flux in the axial direction. This nonuniform flux is the result of the varying distance between permanent magnets 108A-108D and gap 89 due to the tapers of shaft section 58B and sleeve section 78B. This distance becomes smaller as the ferrofluid lubricant moves upward, and the ferrofluid lubricant tends to move in the direction of higher flux density.

At the upper end of surfaces 60B and 82B, the ferrofluid lubricant moves into ports 70 in groove 64. When the ferrofluid lubricant reaches the center of shaft 58, it flows down through passage 68 and then outward through ports 66 so that it can circulate again upwardly.

The ferrofluid lubricant also flows up through center opening 74 and radially outward through gap 95. The fluid then flows down through gap 89 between sleeve surface 82C and shaft surface 60C and in through ports 70 to the center of shaft 58.

Interaction of the ferrofluid lubricant with the tilted surface sections 72A-72F of top section 58C creates a lift force or pressure which lifts sleeve 78 upward in the axial direction until it is limited by the gap 89 between sleeve surface 82B and shaft surface 60B. Gap 89 varies as a function of axial position of sleeve 78; and due to the tapers of shaft section 58B and sleeve section 78B, gap 89 gets smaller as hub 54 and sleeve 78 move upward in the axial direction. The final dimensions of gaps 89 and 95 are a function of the viscosity of the ferrofluid lubricant, the continuous drag on the bearing, and the desired non-repeatable runout of the bearing.

Thrust bearing cap 90 provides the ability to adjust gap 95 between surfaces 72 and 94 and gap 89 between surfaces 60B and 82B. This allows the performance of the bearing (and thus of motor 50) to be adjusted depending on the amount of tighening of thrust bearing cap 90. Preferably, cap 90 is initially threaded all the way in (which provides zero dimension gaps 89 and 95), and then is backed out partially to achieve the desired gap dimensions.

Figure 7:
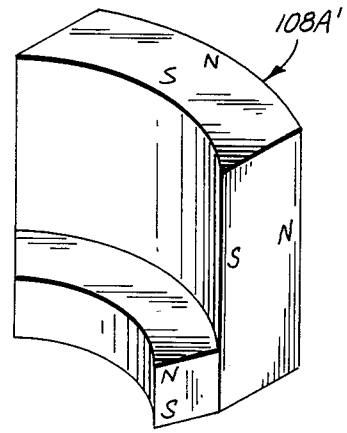
FIG. 7 is a perspective view of a different configuration of a permanent magnet used for rotational drive and ferrofluid containment in the motor of FIG. 3.

FIG. 7 illustrates another embodiment of the present invention, in which magnet 114 and magnets 108A have been integrated to form permanent magnets 108A'. Each of the other three magnets 108B-108D are integrated with magnet 114 in a similar fashion, and therefore are not shown in FIG. 7. The function of magnet 108A' is generally similar to the functions of magnets 108A and 114. This reduces the total number of magnets required, and also simplifies the assembly of motor 50.

FIG. 8 shows further improvements to shaft 58 of motor 50. In this embodiment, an axial bore 140 is formed in shaft 58, and a heat sink rod 142 of high conductivity metal such as copper or aluminum is inserted within bore 140. Lower end 142A of rod 142 is press-fitted into opening 60 in base 52 so that heat can be conducted directly from upper portion 142B of the rod 142 to base 52.

As shown in cross-section in FIG. 8, heat sink rod 142 preferably has axially extending cutout sections 144 to produce a fluted outer surface. This increases the amount of surface area of heat sink rod 142 which is in contact with the circulating ferrofluid lubricant. By use of heat sink rod 142, a lower ambient temperature of the ferrofluid lubricant can be maintained since the thermal conductivity of rod 142 is higher than the material (such as magnetic stainless steel) which forms shaft 58.

Figure 9:
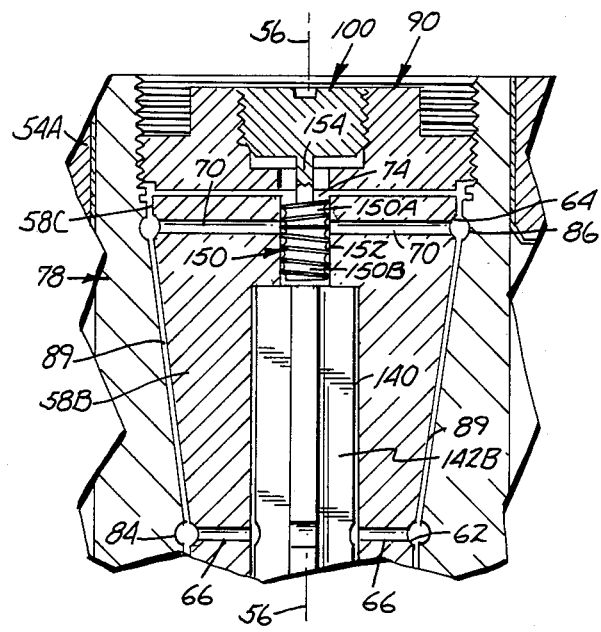
FIG. 9 is a sectional view of a portion of another embodiment of the electric motor which contains an integral positive displacement pump to augment circulating flow of ferrofluid.

FIG. 9 is a partial sectional view showing still another improvement of the motor 50 of FIG. 3. In this embodiment, a positive displacement pump augments flow of the ferrofluid lubricant within the bearing to further enhance uniform cooling. This positive displacement pump uses a screw type impeller 150 positioned in bore 152 of shaft 58. As shown in FIG. 9, bore 152 is aligned with axis 56 and is in communication with ports 70, opening 74, and bore 140. Impeller 150 has an upper set of impeller blades 150A and a lower set 150B which are inclined in opposite directions. Impeller blades 150A pump fluid upward while impeller blades 150B pump fluid downward. Impeller 150 is connected by shaft 154 to screw 100, so that impeller 150 rotates with respect to shaft 58 as sleeve 78, thrust cap 90, screw 100, and hub 54 rotate about axis 56.

In conclusion, the electric motor of the present invention eliminates the need for ball bearings, and thus reduces non-repeatable runout. It is simple in construction, reduces noise and stray flux, and provides barriers to the escape of contaminants from the interior of the motor.

In addition, the present invention provides a simple way to adjust the performance of the bearing within the motor simply by axial adjustment of the relative positions of the sleeve and tapered shaft which varies the permitted gap between tapered inner and outer races.

The preferred embodiments of the present invention also provide for circulation of the ferrofluid lubricant, thus eliminating hot spots, providing more uniform fluid temperatures, and providing lower ambient temperatures of the fluid and the surfaces in which the fluid comes in contact.

Although the present invention has been described with reference to preferred embodiments, workers skilled in the art will recognize that changes may be made in form and detail without departing from the spirit and scope of the invention.

What is claimed is:

1. An electric motor comprising:
   a base;
   a hub for rotation about an axis;
   a magnetically permeable shaft attached to the base for defining the axis; the shaft defining an inner bearing race;
   a magnetically permeable sleeve attached to the hub and coaxially positioned with the shaft, the sleeve defining an outer bearing race spaced from the inner bearing race of the shaft to define a first gap therebetween;
   a ferrofluid lubricant;
   stator winding means supported by the base for providing magnetic fields for causing rotation of the hub; and
   permanent magnet means rotatable with the sleeve; separated from the stator winding means by an air gap, for providing magnetic fields which interact with the magnetic fields provided by the stator winding means to cause rotation of the hub, the permanent magnet means, the shaft and the sleeve forming a magnetic flux path for maintaining the ferrofluid within the gap.

2. The electric motor of claim 1 wherein the inner bearing race includes a tapered exterior surface and the outer bearing race includes a generally parallel tapered interior surface.

3. An electric motor comprising:
   a base;
   a hub for rotation about an axis;
   a magnetically permeable shaft attached to the base for defining the axis, the shaft defining an inner bearing race and having an end surface at a first end of the shaft which is generally perpendicular to the axis;
   a magnetically permeable sleeve attached to the hub and coaxially positioned with the shaft, the sleeve defining an outer bearing race spaced from the inner bearing race of the shaft to define a first gap therebetween, the inner bearing race including a tapered exterior surface and the outer bearing race including a generally parallel tapered interior surface;
   a ferrofluid lubricant;
   stator winding means supported by the base for providing magnetic fields for causing rotation of the hub; and
   permanent magnet means rotatable with the sleeve, separated from the stator winding means by an air gap, for providing magnetic fields which interact with the magnetic fields provided by the stator winding means to cause rotation of the hub, the permanent magnet means, the shaft and the sleeve forming a magnetic flux path for maintaining the ferrofluid within the gap.

4. The electric motor of claim 3 and further comprising:
   a thrust bearing cap connected to the sleeve and having a surface generally parallel to the end surface to define a second gap.

5. The electric motor of claim 4 wherein the thrust bearing cap and the sleeve are connected by threads and the thrust bearing cap is adjustable in an axial direction with respect to the sleeve to cause adjustment of size of the first gap between the inner race and outer race.

6. The electric motor of claim 4 wherein the thrust bearing cap includes a port for introduction of ferrofluid lubricant into the gap and means for sealing the port.

7. The electric motor of claim 4 wherein the shaft includes fluid circulation means for providing circulation of the ferrofluid through the first gap.

8. The electric motor of claim 7 wherein the fluid circulation means includes:
   first annular groove means positioned near a first end of the tapered surfaces;
   second annular groove means positioned near a second end of the tapered surfaces; and
   first fluid passage means through the shaft for connecting first and second annular groove means to permit passage of the ferrofluid lubricant between the first annular groove means to the second annular groove means.

9. The electric motor of claim 8 wherein the first and second gaps are connected and wherein the fluid circulation means further includes:
   second fluid passage means through the shaft for connecting the first annular groove means and the second gap to permit passage of the ferrofluid lubricant therebetween.

10. The electric motor of claim 9 wherein the first annular groove means is positioned closer to the end surface of the shaft than is the second annular groove means and wherein the shaft has a greater diameter at the first end of the tapered exterior surface than at the second end of the tapered exterior surface.

11. The electric motor of claim 7 wherein the fluid circulation means includes an impeller operated by rotation of the hub.

12. The electric motor of claim 4 wherein the end surface has a plurality of tilted sections for causing ferrofluid lubricant circulated over the tilted sections to produce a force component in an axial direction which tends to move the thrust bearing cap away from the end surface and tends to reduce the first gap between the tapered surfaces.

13. An electric motor comprising:
   a base;
   a hub for rotation about an axis;

a magnetically permeable shaft attached to the base for defining the axis; the shaft defining an inner bearing race;

a magnetically permeable sleeve attached to the hub and coaxially positioned with the shaft, the sleeve defining an outer bearing race spaced from the inner bearing race of the shaft to define a first gap therebetween, the inner bearing race including a tapered exterior surface and the outer bearing race including a generally parallel tapered interior surface;

means for adjusting relative axial positions of the sleeve and shaft to vary size of the first gap between the tapered surface;

a ferrofluid lubricant;

stator winding means supported by the base for providing magnetic fields for causing rotation of the hub; and permanent magnet means rotatable with the sleeve, separated from the stator winding means by an air gap, for providing magnetic fields which interact with the magnetic fields provided by the stator winding means to cause rotation of the hub, the permanent magnet means, the shaft and the sleeve forming a magnetic flux path for maintaining the ferrofluid within the gap.

14. An electric motor comprising:

a base;

a hub for rotation about an axis;

a magnetically permeable shaft attached to the base for defining the axis; the shaft defining an inner bearing race and having an internal axial bore;

a magnetically permeable sleeve attached to the hub and coaxially positioned with the shaft, the sleeve defining an outer bearing race spaced from the inner bearing race of the shaft to define a first gap therebetween;

a ferrofluid lubricant;

stator winding means supported by the base for providing magnetic fields for causing rotation of the hub; and permanent magnet means rotatable with the sleeve, separated from the stator winding means by an air gap, for providing magnetic fields which interact with the magnetic fields provided by the stator winding means to cause rotation of the hub, the permanent magnet means, the shaft and the sleeve forming a magnetic flux path for maintaining the ferrofluid within the gap.

15. The electric motor of claim 14 and further comprising:

port means in the shaft for providing fluid flow paths for the ferrofluid lubricant between the first gap and the bore.

16. The electric motor of claim 15 and further comprising:

heat sink means positioned in the bore for removing heat from the ferrofluid lubricant.

17. The electric motor of claim 16 wherein the heat sink means is in thermal contact with the base.

18. An electric motor comprising:

a base;

a hub for rotation about an axis having a first closed end, a second open end and a generally cylindrical side wall;

a magnetic shield coating on interior surfaces of the hub;

a magnetically permeable shaft attached to the base for defining the axis; the shaft defining an inner bearing race;

a magnetically permeable sleeve attached to the hub and coaxially positioned with the shaft, the sleeve defining an outer bearing race spaced from the inner bearing race of the shaft to define a first gap therebetween;

a ferrofluid lubricant;

stator winding means supported by the base for providing magnetic fields for causing rotation of the hub;

permanent magnet means rotatable with the sleeve, separated from the stator winding means by an air gap, for providing magnetic fields which interact with the magnetic fields provided by the stator winding means to cause rotation of the hub, the permanent magnet means, the shaft and the sleeve forming a magnetic flux path for maintaining the ferrofluid within the gap, and the hub and the base defining an essentially closed interior in which the shaft, sleeve, ferrofluid lubricant, permanent magnet means and stator winding means are located.

19. An electric motor comprising:

a base;

a hub for rotation about an axis having a first closed end, a second open end and a generally cylindrical sidewall, the second open end of the hub being positioned adjacent the base;

a first set of annular ribs and grooves on the hub and a second complementary set of ribs and groves on the base which together define a labyrinth passage between the interior and an exterior which surrounds the motor;

a magnetically permeable shaft attached to the base for defining the axis; the shaft defining an inner bearing race;

a magnetically permeable sleeve attached to the hub and coaxially positioned with the shaft, the sleeve defining an outer bearing race spaced from the inner bearing race of the shaft to define a first gap therebetween;

a ferrofluid lubricant;

stator winding means supported by the base for providing magnetic fields for causing rotation of the hub; and permanent magnet means rotatable with the sleeve, separated from the stator winding means by an air gap, for providing magnetic fields which interact with the magnetic fields provided by the stator winding means to cause rotation of the hub, the permanent magnet means, the shaft and the sleeve forming a magnetic flux path for maintaining the ferrofluid within the gap, and the hub and the base defining an essentially closed interior in which the shaft, sleeve, ferrofluid lubricant, permanent magnet means and stator winding means are located.

20. The electric motor of claim 9 and further comprising:

a magnetic shield coating on interior surfaces of the hub, the coating extending into the labyrinth passage.

21. An electric motor comprising:

a base;

a hub for rotation about an axis having a first closed end, a second open end and a generally cylindrical sidewall;

a magnetically permeable shaft attached to the base for defining the axis; the shaft defining an inner bearing race;

a magnetically permeable sleeve attached to the hub and coaxially positioned with the shaft, the sleeve defining an outer bearing race spaced from the inner bearing race of the shaft to define a first gap therebetween;

a ferrofluid lubricant;

stator winding means supported by the base for providing magnetic fields for causing rotation of the hub;

permanent magnet means rotatable with the sleeve, separated from the stator winding means by an air gap, for providing magnetic fields which interact with the stator winding means to cause rotation of the hub, the permanent magnet means, the shaft and the sleeve forming a magnetic flux path for maintaining the ferrofluid within the gap, and the hub and the base defining an essentially closed interior in which the shaft, sleeve, ferrofluid lubricant, permanent magnet means and stator winding means are located;

means for supporting the stator winding means at a position between the permanent magnet means and the side wall of the hub, the stator winding means being separated from the permanent magnet means by a first air gap and separated from the side wall of the hub by a second air gap, the means for supporting the stator winding means being located on the base.

22. The electric motor of claim 21 wherein the means for supporting the stator winding means includes vibration isolator means for preventing transmission of vibration from the stator winding means to the base.

23. An electric motor comprising:
a first member;
a second member;
an externally tapered shaft attached to the first member and defining an axis of rotation;
an internally tapered sleeve attached to the second member and coaxially positioned with respect to the externally tapered shaft to define a first gap therebetween which is a function of relative axial position of the internally tapered sleeve and externally tapered shaft;
means for adjusting relative axial positions of the internally tapered sleeve and externally tapered shaft to vary size of the first gap;
means for maintaining a ferrofluid lubricant in the first gap; and
means for causing rotation of one of the first and second members about the axis.

24. The electric motor of claim 23 wherein the means for maintaining a ferrofluid lubricant in the first gap includes a reservoir means in fluid communication with the first gap for providing a supply of ferrofluid lubricant to the first gap.

25. The electric motor of claim 24 wherein the means for maintaining a ferrofluid lubricant further includes fluid circulation means for causing the ferrofluid lubricant to circulate through a flow path which includes the first gap and the reservoir means.

26. The electric motor of claim 25, wherein the fluid circulation means includes an impeller operated by the rotation of one of the first and second members.

27. The electric motor of claim 23 wherein the means for maintaining the ferrofluid lubricant in the first gap includes means for establishing a magnetic flux path through the gap which causes the ferrofluid lubricant to be confined in axial directions.

28. The electric motor of claim 27 wherein the means for establishing a magnetic flux path includes a plurality of permanent magnets mounted on the sleeve.

29. The electric motor of claim 23 wherein the first member is stationary and the means for causing rotation includes:
permanent magnet means supported by and rotatable with the sleeve;
stator winding means supported by the first member; and
means for selectively energizing the stator winding means.

30. The electric motor of claim 23 wherein the externally tapered shaft has an end surface at a first end of the externally tapered shaft which is generally perpendicular to the axis.

31. The electric motor of claim 23 wherein the second member has first closed end, a second open end and generally cylindrical side wall.

32. The electric motor of claim 31 wherein the first and second members define and essentially closed interior in which the shaft and sleeve are located.

33. The electric motor of claim 32 and further comprising:
a magnetic shield coating on interior surfaces of the second member.

34. An electric motor of claim 32 wherein the second open end of the second member is positioned adjacent the first member, and wherein the second member has a first set of annular ribs and grooves and the first member has a second complementary set of ribs and grooves which together define a labyrinth passage between the interior and an exterior which surrounds the motor.

35. The electric motor of claim 34 and further including:
a magnetic shield coating on interior surfaces of the second member, the coating extending into the labyrinth passage.

36. An electric motor comprising:
a first member;
a second member;
an externally tapered shaft attached to the first member and defining an axis of rotation and having an end surface at a first end of the externally tapered shaft which is generally perpendicular to the axis of rotation;
an internally tapered sleeve attached to the second member and coaxially positioned with respect to the externally tapered shaft to define a first gap therebetween which is a function of relative axial position of the internally tapered sleeve and externally tapered shaft;
a thrust bearing cap connected to the sleeve and having a surface generally parallel to the end surface to define a second gap;
means for maintaining a ferrofluid lubricant in the first gap; and
means for causing rotation of one of the first and second members about the axis.

37. The electric motor of claim 36 wherein the thrust bearing cap and the sleeve are connected by threads and the thrust bearing cap is adjustable in an axial direction with respect to the sleeve to cause adjustment of size of the first gap between the inner race and outer race.

38. The electric motor of claim 36 wherein the thrust bearing cap includes a port for introduction of ferrofluid lubricant into the gap and means for sealing the port.

39. The electric motor of claim 36 and further including:
first and second annular groove means positioned proximate opposite ends of the first gap; and
first fluid passage means through the shaft for connecting first and second annular groove means to permit passage of the ferrofluid lubricant between the first annular groove means to the second annular groove means.

40. The electric motor of claim 39 wherein the first and second gaps are connected, and further including:
second fluid passage means through the shaft for connecting the first annular groove and the second gap to permit passage of the ferrofluid lubricant therebetween.

41. The electric motor of claim 40 wherein the first annular groove means is positioned closer to the end surface of the shaft than is the second annular groove means and wherein the shaft has a greater diameter proximate the first annular groove means than proximate the second annular groove means.

42. The electric motor of claim 36 wherein the end surface has a plurality of tilted sections for causing ferrofluid lubricant circulated over the tilted sections to produce a force component in an axial direction which tends to move the thrust bearing cap away from the end surface and tends to reduce the first gap between the tapered surfaces.

43. An electric motor comprising:
a first member;
a second member;
an externally tapered shaft attached to the first member and defining an axis of rotation, the externally tapered shaft having an internal axial bore;
an internally tapered sleeve attached to the second member and coaxially positioned with respect to the externally tapered shaft to define a first gap therebetween which is a function of relative axial position of the internally tapered sleeve and externally tapered shaft;
means for maintaining a ferrofluid lubricant in the first gap; and
means for causing rotation on one of the first and second members about the axis.

44. The electric motor or claim 43 and further including:
port means in the shaft for providing flow paths for the ferrofluid lubricant with the first gap and the internal axial bore.

45. The electric motor of claim 44 and further including:
heat sink means positioned in the internal axial bore for removing heat from the ferrofluid lubricant.

46. The electric motor of claim 45 wherein the heat sink means is in thermal contact with the first member.

* * * * *

UNITED STATES PATENT AND TRADEMARK OFFICE
CERTIFICATE OF CORRECTION

PATENT NO. : 4,734,606

DATED : March 29, 1988

INVENTOR(S) : Chester S. Hajec

It is certified that error appears in the above-identified patent and that said Letters Patent is hereby corrected as shown below:

Column 7, line 41, after "sleeve", delete ";" (semi-colon) and insert --,-- (comma).

Column 10, line 31, delete "groves" and insert --grooves--.

Column 10, line 58, after "claim", delete "9" and insert --19--.

Column 12, line 24, after "define", delete "and" and insert --an--.

Column 12, line 30, after "34.", delete "An" and insert --The--.

Column 14, line 17, after "rotation", delete "on" and insert --of--.

Column 14, line 21, after "providing", insert --fluid--.

Signed and Sealed this

Nineteenth Day of July, 1988

*Attest:*

DONALD J. QUIGG

*Attesting Officer*   *Commissioner of Patents and Trademarks*